(No Model.) 2 Sheets—Sheet 1.
J. A. HANDELAND.
PLANTER.
No. 454,348. Patented June 16, 1891.
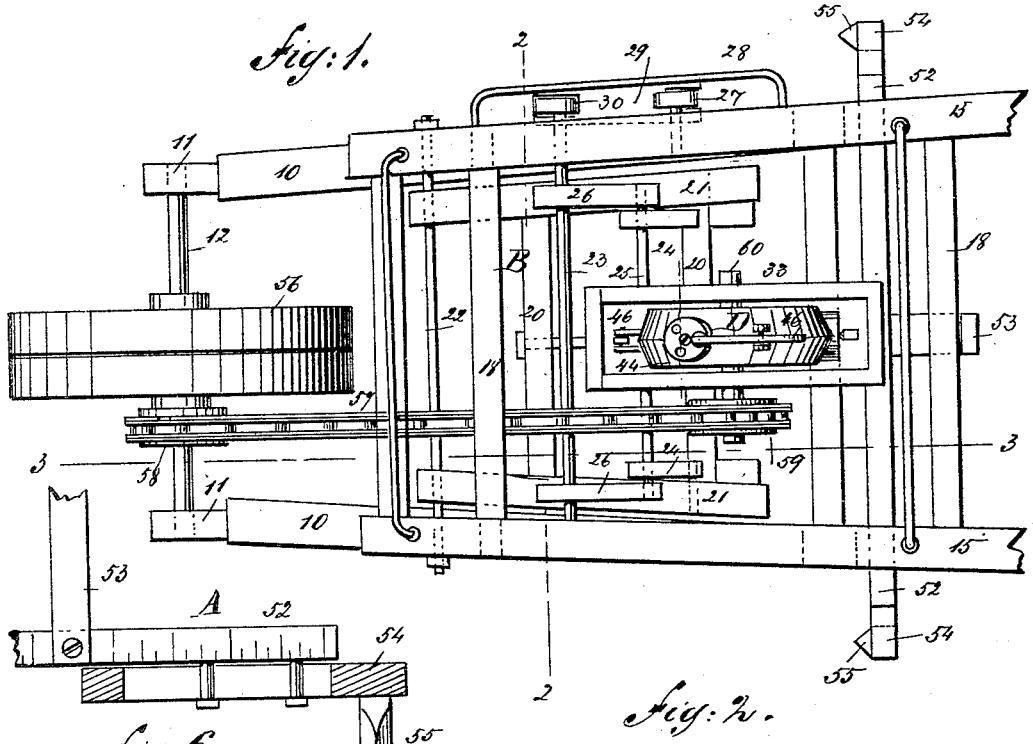
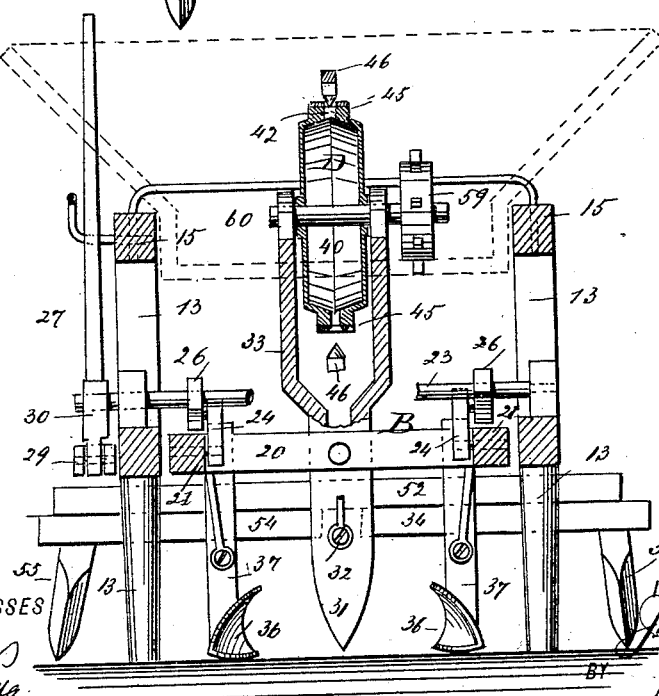
WITNESSES
Chas. Nida
C. Sedgwick
INVENTOR:
J. A. Handeland
BY
Munn & Co.
ATTORNEYS

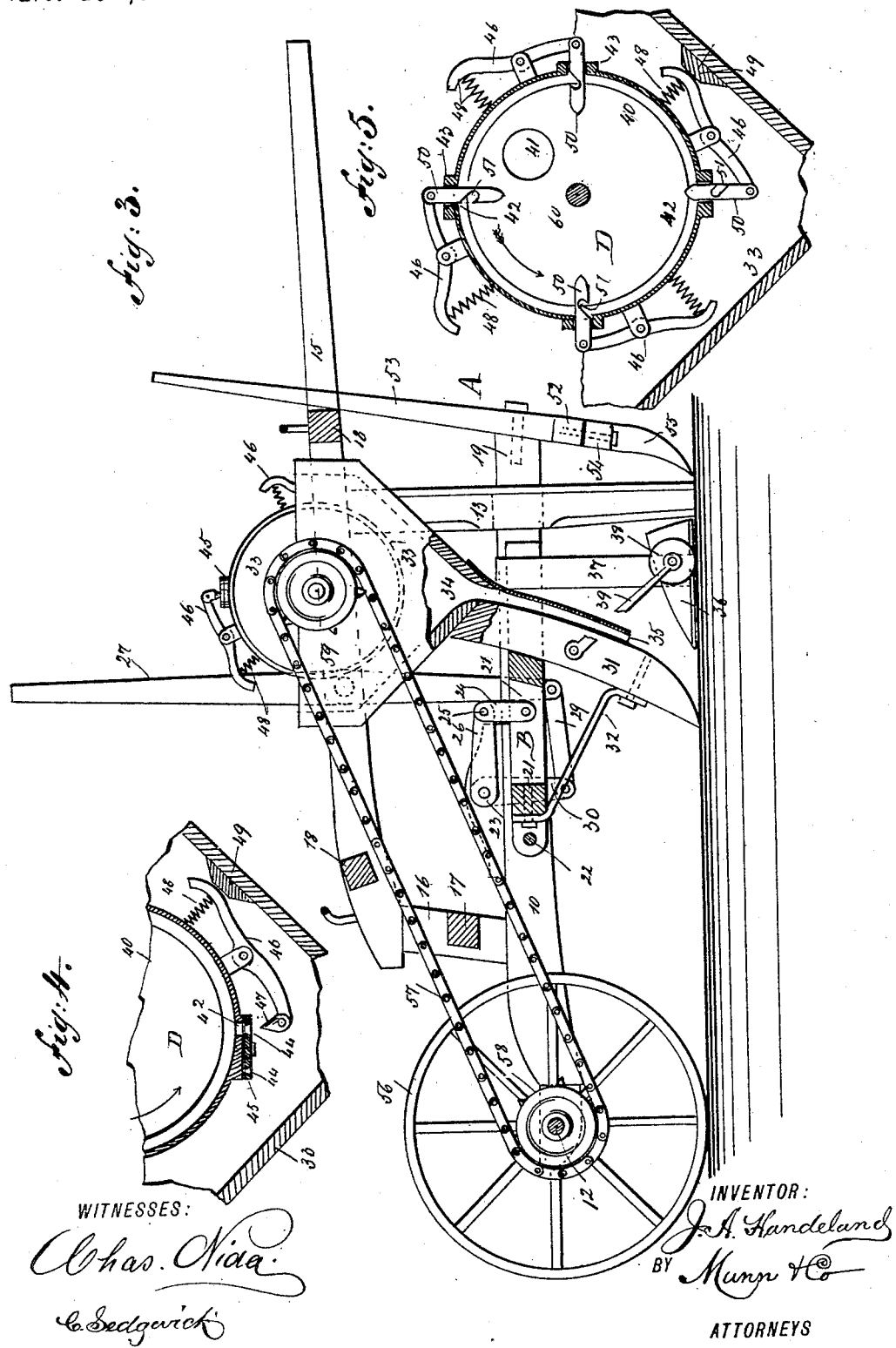

UNITED STATES PATENT OFFICE.

JOHN A. HANDELAND, OF JACKSON COUNTY, MINNESOTA.

PLANTER.

SPECIFICATION forming part of Letters Patent No. 454,348, dated June 16, 1891.

Application filed August 20, 1890. Serial No. 362,526. (No model.)

*To all whom it may concern:*

Be it known that I, JOHN A. HANDELAND, of Jackson county, Minnesota, (Lake Park P. O., in the county of Dickinson and State of Iowa,) have invented a new and useful Improvement in Planters, of which the following is a full, clear, and exact description.

My invention relates to an improvement in seed-planters, and has for its object to provide an implement especially adapted for garden use, so constructed that it may be utilized for planting seed or for cultivating young plants, and when the planting mechanism is removed the implement may be employed as a wheelbarrow.

A further object of the invention is to provide a machine of simple, durable, and light construction and capable of convenient manipulation.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a transverse section on line 2 2 of Fig. 1. Fig. 3 is a longitudinal section on line 3 3 of Fig. 1. Fig. 4 is a partial vertical section through the seed-box. Fig. 5 is a view similar to Fig. 4, illustrating a modified form of seed-dropper; and Fig. 6 is a detail view of a portion of the marker.

The frame of the implement consists of two side bars 10, provided with journals 11 at one end, in which the wheel-shaft 12 has a bearing. Uprights 13 are secured to the rear ends of the side bars 10, which uprights extend above and below the bars, as shown in Fig. 3, the lower portion of the uprights constituting legs for the frame, while the upper ends are adapted to support handles 15, which handles are continued downward at an inclination in the direction of the front and their forward or front ends are attached to uprights 16, secured to the side bars 10, the said uprights being connected by a suitable brace-bar 17. The handles 15 are braced by cross-bars 18 or their equivalents, the rear uprights being similarly braced by a cross-bar or beam, and upon the projection 19 of the said cross-bar or beam the marker A is pivoted.

Within the main frame, between the lower side bars 10, an essentially rectangular frame B is pivoted, the said frame consisting of front and rear bars 20 and side bars 21, the said side bars being carried beyond the front and rear bars, and the forward extremities of the side bars of the frame B are pivoted to the main frame by passing a pin or rod 22 through the side bars 10 of the main frame and the said side bars of the inner or auxiliary frame B, as is best shown in Fig. 1. This auxiliary frame is adapted to carry the entire seed-dropping mechanism.

The frame is held in proper position and raised and lowered by connection with a rock-shaft 23, which shaft is journaled in bearings located upon the upper face of the side bars 10 of the main frame between the front and rear uprights 13 and 16. The attachment between the rock-shaft and the auxiliary frame is effected, preferably, by pivoting upwardly and forwardly extending links 24 to the sides of the auxiliary frame, which links are pivotally attached to a rod 25, having its extremities securely attached in arms 26 projected from the rock-shaft, one near each end, as is best shown in Fig. 1.

The rock-shaft is manipulated through the medium of a hand-lever 27, which lever is preferably located at the right hand of the machine and is passed upward above the handles within convenient reach of the operator, and the upper portion of the lever is adapted to engage with any suitable form of rack 28.

The lower end of the hand-lever 27 is connected by a link 29 with a crank-arm 30, securely attached to the right-hand extremity of the rock-shaft.

At or near the center of the rear cross-bar of the auxiliary frame B a plow-stock 31 is secured, which plow-stock has a forward inclination and is adapted to create a furrow for the reception of the seed to be dropped, the plow-stock being securely braced in position by a rod 32, bolted to its forward face at one end and to the forward cross-bar of the auxiliary frame at its opposite end, as is best shown in Fig. 3.

Upon the upper end of the stock a box-like hopper 33 is securely attached, the bottom of which hopper is inclined downward toward the rear side of the plow-stock, and an opening 34 is created in the hopper leading into an extension 35, consisting of a trough-like structure erected upon the rear face of the plow-stock, its upper end being secured to the back of the hopper, as is best shown in Fig. 3. The seed in passing from the hopper enters the extension 35 and drops into the furrow directly at the rear of the plow-stock. The earth is thrown upward in the furrow at each side to cover the seed by means of cover-blades 36, having their inner faces somewhat concaved, as shown in Fig. 2. The outer faces of the said blades are attached in any suitable or approved manner to the lower extremities of standards 37, the upper ends of which standards are secured to the side pieces at the rear of the auxiliary frame. Immediately at the rear of the plow-stock a roller 38 is located, pivoted in arms 39, attached to the plow-stock, the object of which roller is to press the soil upon the seed after it has been dropped into the furrow and covered by the cover-blades 36.

The seed-box D consists of a circular box 40, which box is preferably provided with a capped side opening 41, through which the seed is entered. In the peripheral surface of the box a number of apertures 42 is produced, preferably surrounded by an exterior circular boss 43, having a corresponding central opening, as shown in Fig. 5; or the apertures 42 may be made to register with one of a series of openings 44, produced in a disk 45, which disk is pivoted at its center upon an offset formed upon the outer peripheral surface of the wheel, as shown in Fig. 4. In this latter construction the apertures in the disk are graduated, so that when the larger of the apertures 44 registers with the aperture in the box a maximum quantity of seed will leave the box, and when the smaller aperture of the disk is brought in registry with the aperture in the box a minimum quantity of seed will leave the latter.

The seed is permitted to leave the box only when the apertures face the lower contracted end of the hopper, and until the apertures are brought into this position they are kept closed by means of levers 46, one of which levers is pivoted upon the periphery of the box near each drop-aperture, and one extremity of each lever is provided with a preferably conical pivoted head 47, adapted to enter the drop-openings 44 of the disks, which are also more or less conical, and the heads of the levers are normally held in said apertures 44 by means of springs 48 bearing against their opposite ends and the box. When, however, one of the apertures 44 registering with the box-aperture 42 is brought downward to the position shown in Fig. 4, the spring-controlled end of the lever near said aperture engages with a boss 49 upon the inner inclined face of the hopper, and the said spring-pressed end is carried inward, and the head of the lever thereby withdrawn from the disk-opening, and the seed is permitted to drop from the registering openings into the hopper, from whence it passes through the extension 35 into the furrow, as heretofore mentioned.

In Fig. 5 a slight modification in the mechanism for dropping the seed is illustrated. The disks 45 are not employed, and in their stead a block 50 is pivoted to one end of each of the levers 46, the said blocks being adapted to neatly fit and pass through the apertures 42 into the interior of the box, each block being provided with a diagonal recess 51 in one edge. Thus when a seed-aperture 42 is brought into proper position to discharge the seed the lever engages with the boss 49, and the end pivoted to the block is forced away from the box, which causes the block to be withdrawn from the box, and the seed contained in its recess 51 drops therefrom into the hopper. The blocks 50 and heads 47 are detachably secured to the levers 46, in order that they may be used interchangeably.

The marker A consists of a horizontal bar 52, having attached to its center a perpendicular arm 53, which arm is carried upward between the handles within convenient reach of the operator. Upon the outer face of the bar 52 a scale is preferably produced, and upon the under face of the horizontal bar, at each side of the center, a parallel bar 54 is held to slide, the sliding bars being also preferably provided with a scale upon their outer faces, and the said bars may be locked by any approved mechanism—as, for instance, by means of a set-screw—the bars being adjustable longitudinally of the upper or body bar 52 of the marker.

Each of the adjustable bars 54 has projected downward from its outer end a tooth 55, the said tooth being adapted to enter the ground and mark the hills. As the marker is pivoted to the frame of the implement, by carrying the handle 53 to the right or to the left the marks may be produced in the ground either upon the right or upon the left hand side of the implement.

If desired, the auxiliary frame B, carrying the dropping mechanism, may be readily detached from the main frame by simply withdrawing the rods 22 and 25, and the implement may be utilized as a wheelbarrow by placing a suitably-shaped box in the body of the main frame, as illustrated in dotted lines, Fig. 2, or the seed-box and hopper may be readily removed from connection with the plow-stock and the said stock be utilized for the usual purpose. By removing the plow-stock the cover-blades 36 may be utilized for cutting weeds and throwing the earth in engagement with the roots of growing plants, or the blades may be removed and any other form of cultivating-blade be substituted.

Upon the axle 12 a supporting-wheel 56 is journaled, which supporting-wheel may be placed in the center of the axle, as illustrated in Fig. 1, and, as the said wheel is preferably made in two sections, it may be divided and one section be located near each end of the spindle. The seed-box is revolved through the medium of a chain belt 57, which passes over a sprocket-wheel 58, fast to one section of the supporting-wheel 56, and also over a second sprocket-wheel 59, secured to a shaft 60, which journals the seed-box in the hopper.

Having thus described my invention, I claim as new and desire to secure by Letters Patent—

1. In a planter, a seed-dropper consisting of a cylindrical box provided with peripheral apertures and spring-pressed levers fulcrumed upon the periphery of the said box to swing in vertical planes, the said levers being provided with heads adapted to enter and normally close the apertures in the box, substantially as shown and described.

2. In a planter, a seed-dropper consisting of a revoluble cylindrical box provided with a series of apertures in its peripheral surface and spring-pressed levers fulcrumed upon the periphery of the box to swing in vertical planes, one near each aperture, one end of which levers is adapted to enter and normally close the apertures of the box, as and for the purpose specified.

3. In a seed-planter, the combination, with a hopper, of a seed-dropper consisting of a box-like body journaled in the hopper and provided with a series of apertures in its peripheral surface, spring-pressed levers journaled upon the periphery of the box-like body, one near each aperture, one end of said levers being adapted to normally close the peripheral apertures of the box-like body, and a boss formed upon the inner surface of the hopper and adapted for engagement with the levers, as and for the purpose specified.

4. In a planter, the combination, with the main frame provided with an axle journaled in its forward end and a supporting-wheel held to revolve upon the axle, of an auxiliary frame removably pivoted within the main frame, a seed-dropping mechanism carried by the auxiliary frame, and a belt connection between the seed-dropping mechanism and the supporting-wheel, as and for the purpose set forth.

5. In a planter, the combination, with a main frame provided with an axle journaled in its forward end and a supporting-wheel held to revolve upon the axle, of an auxiliary frame removably pivoted within the main frame, a plow-stock attached to the auxiliary frame, a seed-dropping mechanism supported by the plow-stock and extending downward at the rear of the stock, cover-blades also connected with the auxiliary frame, one at each side of the plow-stock, and a connection between the axle and the seed-dropping mechanism, as and for the purpose set forth.

6. In a planter, the combination, with a main frame, an axle journaled in the forward portion of the frame, and a supporting-wheel held to revolve upon the axle, of an auxiliary frame removably pivoted in the main frame, a rock-shaft journaled in the main frame, a link connection between the rock-shaft and the auxiliary frame, a hand-lever attached to the rock-shaft, and a seed-dropping mechanism carried by the auxiliary frame, as and for the purpose set forth.

7. In a planter, the combination, with a main frame, an axle journaled in the forward portion of the frame, a supporting-wheel held to revolve upon the axle, a rock-shaft journaled upon the main frame, and a lever connected with one end of the rock-shaft, of an auxiliary frame removably pivoted in the main frame, a link connection between the rock-shaft and auxiliary frame, a plow-stock secured to the auxiliary frame, shares also supported by the auxiliary frame, one at each side of the plow-stock, a seed-dropping mechanism supported upon the plow-stock, and a driving mechanism connecting the axle and the seed-dropping mechanism, as and for the purpose specified.

8. In a planter, the combination, with the frame thereof, of a marker pivoted thereon, consisting of a horizontal bar provided with an attached upwardly-extending handle, parallel bars adjustably connected with the under face of the horizontal bar, and teeth projected downward from the ends of the adjustable bars, as and for the purpose set forth.

9. In a planter, the combination, with the frame thereof, of a marker pivoted to the frame, comprising a horizontal body-bar having a scale produced upon its outer face, a handle upwardly projected from the body-bar, adjustable parallel bars also provided with a scale upon their outer faces and connected with the under face of the body-bar, and a tooth projected downward from the outer end of each of the adjustable bars, substantially as and for the purpose set forth.

JOHN A. HANDELAND.

Witnesses:
T. T. HANDELAND,
THEODORE AUSHAM.